May 8, 1923.
J. W. CARLSON
WATER MOTOR
Filed Aug. 11, 1921
1,454,212
6 Sheets—Sheet 1
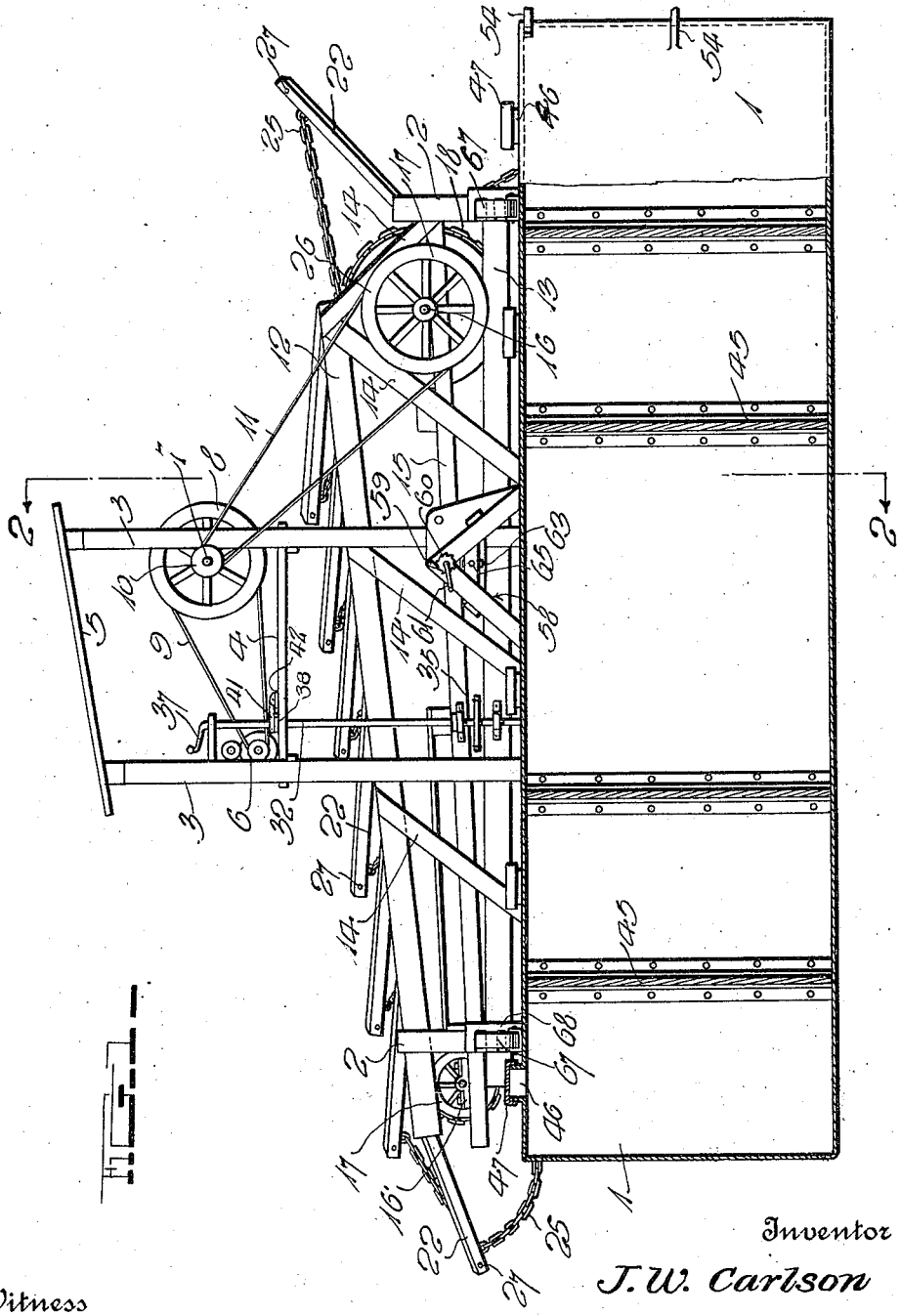
Witness
H. Woodard
Inventor
J. W. Carlson
By H. B. Willson &co
Attorneys May 8, 1923.
J. W. CARLSON
WATER MOTOR
Filed Aug. 11, 1921
1,454,212
6 Sheets-Sheet 2
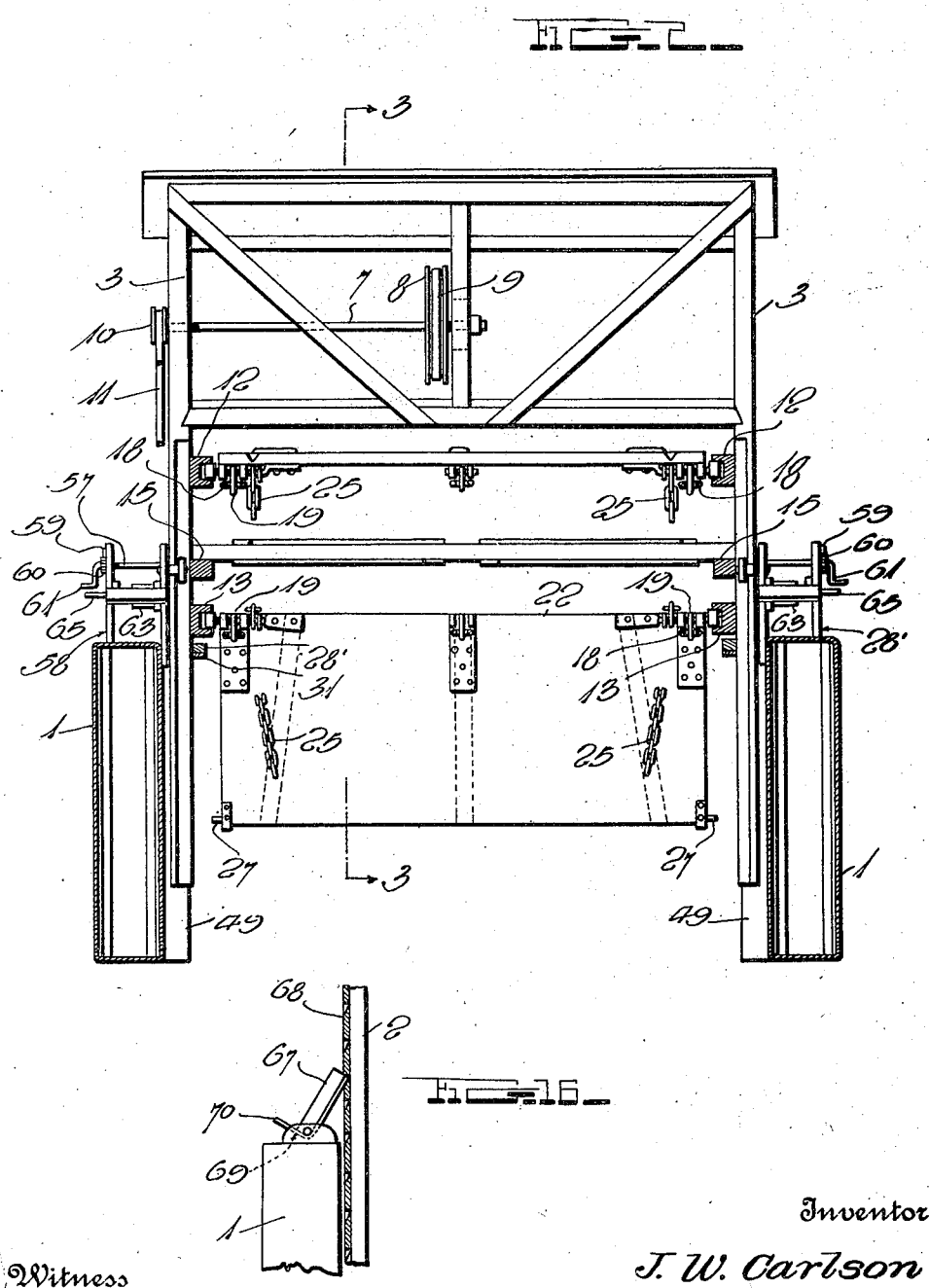
Witness
H. Woodard
Inventor
J. W. Carlson
By H. R. Wilson Yeo
Attorneys May 8, 1923.  1,454,212
J. W. CARLSON
WATER MOTOR
Filed Aug. 11, 1921   6 Sheets-Sheet 3
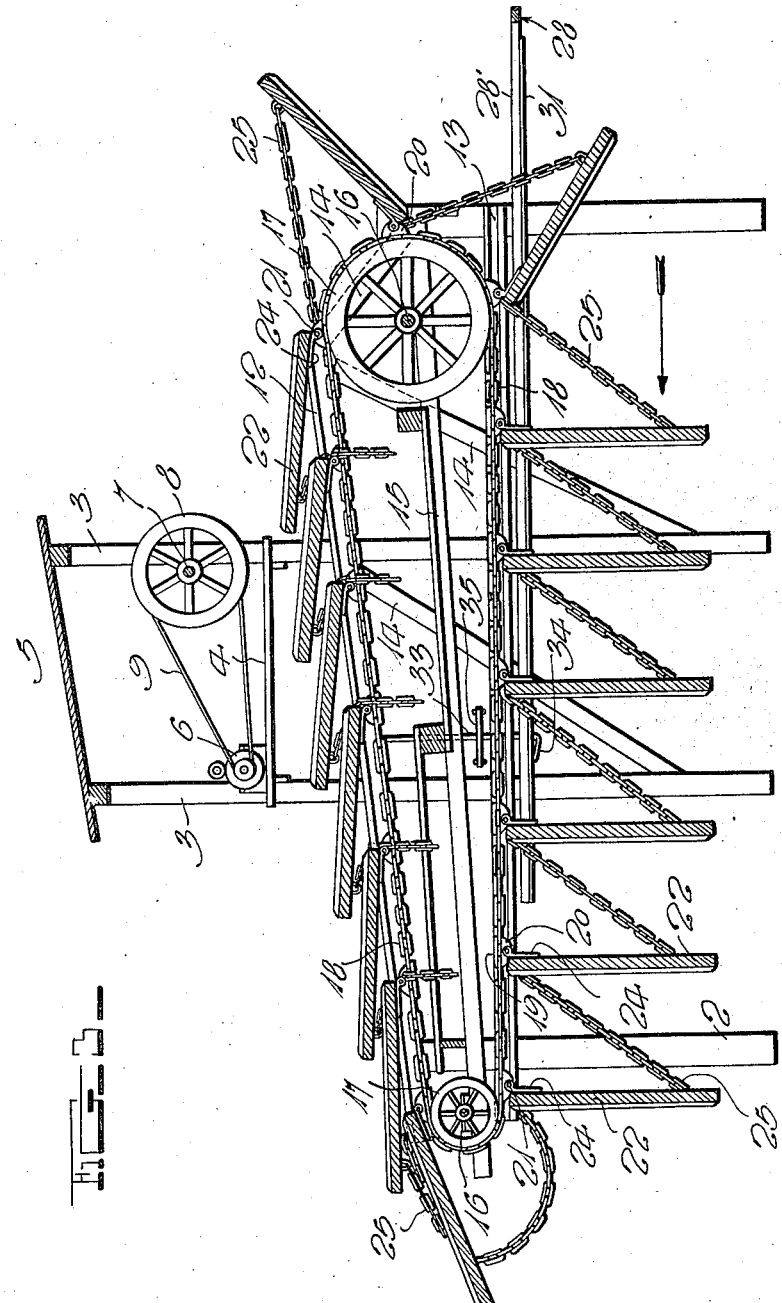
Witness
H. Woodard
Inventor
J. W. Carlson
By H. B. Willson & Co.
Attorneys

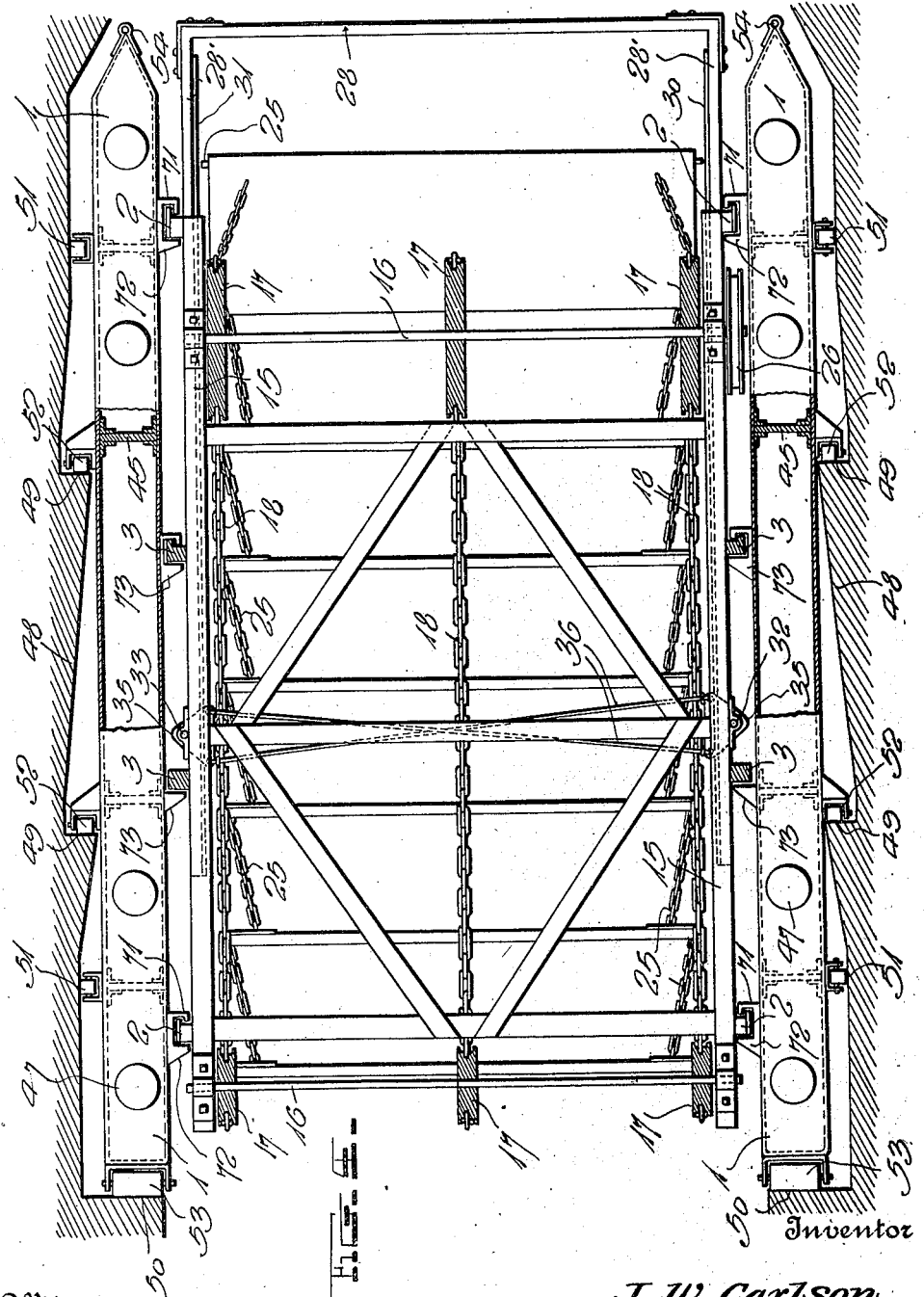

May 8, 1923.  
J. W. CARLSON  
WATER MOTOR  
Filed Aug. 11, 1921
1,454,212
6 Sheets—Sheet 5
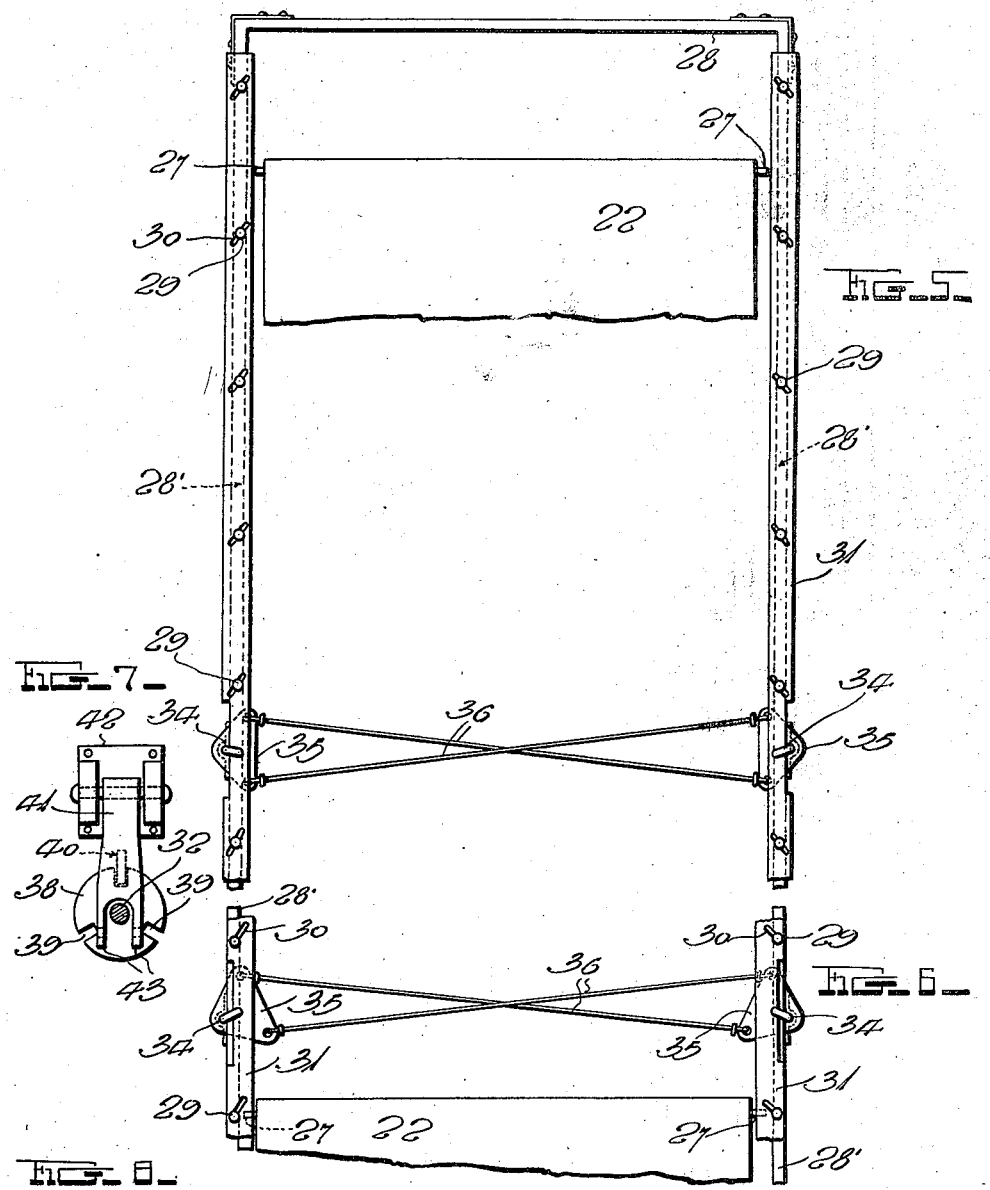
Inventor  
J. W. Carlson
By H. B. Willson & Co.  
Attorneys
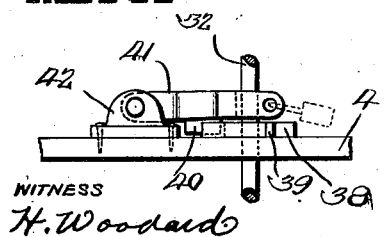
WITNESS  
H. Woodard

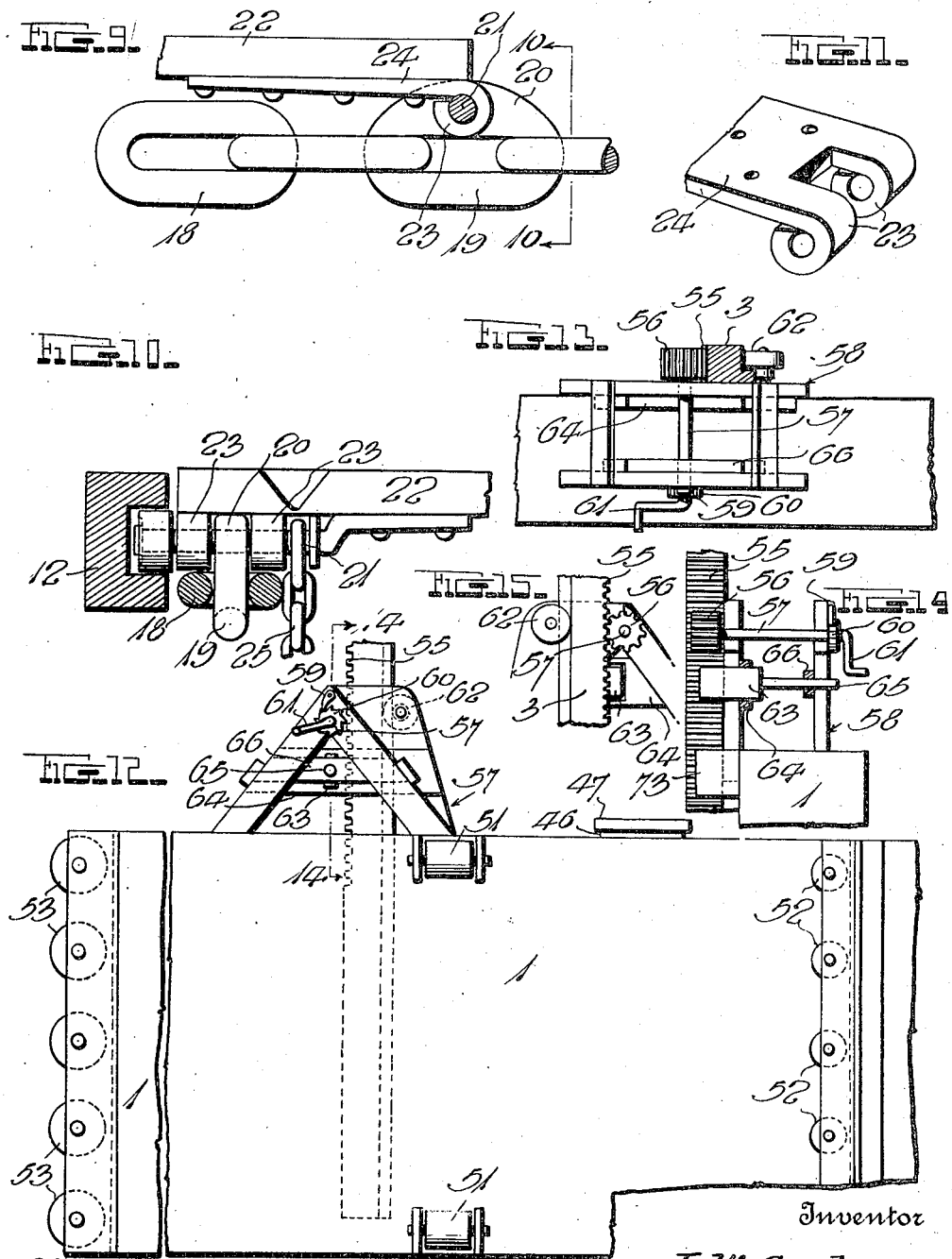

Patented May 8, 1923.

1,454,212

UNITED STATES PATENT OFFICE.

JOHN W. CARLSON, OF SALT LAKE CITY, UTAH, ASSIGNOR OF ONE-HALF TO HERBERT S. REED, OF SALT LAKE CITY, UTAH.

WATER MOTOR.

Application filed August 11, 1921. Serial No. 491,500.

*To all whom it may concern:*

Be it known that I, JOHN W. CARLSON, a citizen of the United States, residing at Salt Lake City, in the county of Salt Lake and State of Utah, have invented certain new and useful Improvements in Water Motors; and I do declare the following to be a full, clear, and exact description of the invention, such as will enable others skilled in the art to which it appertains to make and use the same.

This invention relates to an improved water motor of the running stream operated type and one object of the invention is to provide a water motor having an improved frame construction for carrying a generator and a water actuated driving means for the generator, the driving means including endless carriers and paddle boards pivotally connected with the carriers and limited in their swinging movement in one direction so that they may be held in an extended position when engaged by the running water of the stream or river.

Another object of the invention is to provide the frame with improved means for releasably holding the paddle boards against downward movement into the running water thus permitting the motor to be rendered inoperative when desired.

Another object of the invention is to provide improved means for pivotally connecting the paddle boards with the endless carrier chains and to provide improved track means for engagement by pins carried by the pivoted end portions of the paddle boards, the track engaging end portions of the pins being provided with rollers so that they may move easily along the tracks.

Another object of the invention is to provide the frame with improved means for moving strips which extend longitudinally thereof into and out of position for engagement by pins extending from the free end portions of the paddle blades, the strips when extended to an operative position engaging the pins and preventing the paddle blades from dropping downwardly into the running stream.

Another object of the invention is to provide a motor having the frame vertically adjustable with respect to the floats which float in the water thus permitting the extent to which the paddle blades will extend into the water to be controlled.

Another object of the invention is to provide an improved construction of float and to provide the floats with rollers which may engage the sides of docks or piers, the rollers holding the floats in spaced relation to the docks and piers and preventing the water motor from having transverse movement in the stream and certain of the rollers engaging abutment shoulders formed upon the docks or piers to prevent the motor from being carried down stream.

This invention is illustrated in the accompanying drawings, wherein:

Figure 1 is a view showing the improved water motor in side elevation with one end portion of one of the floats shown in section.

Figure 2 is a vertical transverse sectional view through the motor taken along the line 2—2 of Fig. 1.

Figure 3 is a vertical longitudinal sectional view through the motor taken along the line 3—3 of Fig. 2.

Figure 4 is a longitudinal transverse sectional view through the motor.

Figure 5 is a bottom plan view showing the paddle supporting strips in an inoperative position.

Figure 6 is a similar view showing the strips moved outwardly into an operative position for engaging the pins of the paddles and supporting them in an inoperative position.

Figure 7 is a fragmentary view showing in top plan a lock for releasably holding an actuating shaft of the strip adjusting means against rotation.

Figure 8 is a view showing the structure of Fig. 7 in side elevation.

Figure 9 is an enlarged view in side elevation showing the connection between one of the endless carrier chains and one end portion of one of the paddle boards.

Figure 10 is a sectional view taken along the line 10—10 of Fig. 9.

Figure 11 is a perspective view of a bearing bracket for connecting the paddle boards with the endless chains.

Figure 12 is a view in side elevation showing a portion of one of the floats and the means for vertically adjusting the frame.

Figure 13 is a top plan view of the means for vertically adjusting the frame.

Figure 14 is a fragmentary view taken along the line 14—14 of Fig. 12 and showing a portion of the lifter shown in Fig. 13.

Figure 15 is a fragmentary view showing in side elevation a portion of the structure shown in Fig. 14.

Figure 16 is a fragmentary view showing in side elevation a device for releasably supporting the frame in a raised position.

This improved motor is provided with floats 1 which carry a frame including standards 2 and 3, the standards 3 being extended upwardly to form corner posts for a support or housing provided with a platform 4 and roof 5. A generator 6 will be mounted upon the platform 4 and a driving shaft 7 will be rotatably connected with the corner posts 3 at one end of the housing. This driving shaft 7 carries a large pulley wheel 8 about which passes a belt 9 so that rotary movement can be transmitted to the generator 6, pump or other device which may be operated from the shaft 7, and the shaft 7 further carries a small pulley 10 about which will pass a belt 11 so that rotary movement can be transmitted to the driving shaft as will be hereinafter brought out. Upper and lower tracks 12 and 13 extend longitudinally of the frame and are secured to the standards 2 and 3 and are braced by braces 14 so that the tracks will be held in the proper position. Each of these tracks is formed of a paddle strip as shown in Fig. 2. The frame will be provided with suitable horizontal braces extending transversely thereof as shown in Fig. 4 but these have not been specifically described since the detailed structure will be changed according to the size of motor built.

The frame is provided between the upper and lower tracks 12 and 13 with longitudinally extending beams 15 which carry bearings adjacent the forward and rear ends of the frame so that shafts 16 which extend transversely through the frame may be rotatably mounted. These shafts 16 carry sprocket wheels 17 about which pass endless chains 18. The chains 18 are formed of links as shown in Fig. 4 and each chain is provided at points throughout its length with specially constructed links 19 which are flattened to provide extensions 20 as shown in Figs. 9 and 10. These flattened portions 20 are provided with openings to receive the pivot pins 21 which are secured to the paddle boards 22 and in addition to passing through the openings of the flattened portions 20 of these links 19, also pass through the bearing arms 23 of hinged brackets 24 secured to the paddle boards and having the extensions of the links positioned between their bearing arms. It will thus be seen that the paddle boards 22 will be hingedly connected with the endless carrier chains and may have swinging movement into and out of an operative position. The pins 21 are extended beyond the sides of the paddle boards and have their end portions fitting into the tracks and provided with rollers so that the pins can move easily through the tracks. In order to limit swinging movement of the paddle boards and brace them when extending in an operative position from the lower flights of the chains 18, there has been provided bracing chains 25 which are connected with the free end portions of the paddle boards and at their inner ends are mounted upon the pins 21. One of the shafts 16 carries a pulley wheel 26 about which passes the belt 11 so that when the motor is in operation, rotary movement can be transmitted to shaft 7 from the water actuated driving means for this shaft 7.

When this motor is in place, it is not desired to have the motor continually in operation and in order to render the motor inoperative, there has been provided means for preventing the paddle boards of the lower flights of the chains 18 from dropping down into the stream or river. Each of the paddle boards is provided with pins 27 at its free end which extend transversely from the sides of the paddle boards but are short enough so that they will not engage the tracks 12 and 13. A stub frame 28 is carried by the main frame and is provided with side bars 28' which extend longitudinally of the frame beneath the lower tracks 13. These side bars 28' carry pins 29 which extend through slots 30 formed diagonally in supporting strips 31 so that the supporting strips may be moved transversely of the side arms 28' into and out of position for engagement by the pins 27 of the paddle boards. When the supporting strips 31 are in a retracted position beneath the side bars 28', the paddle boards may swing downwardly to the operative position but when the supporting strips are moved outwardly to an operative position, the pins 27 of the paddle boards will engage these strips and the paddle boards will be held in a substantially horizontal position and thus prevented from moving down into the water of the stream or river. In order to operate the strips and move them into and out of an operative position, there has been provided shafts 32 and 33 which are positioned vertically of the frame. Each of the shafts 32 and 33 has a hook-shaped lower end portion 34 which terminates in an upturned prong or finger fitting into an opening of the strip 31 with which the shaft is connected. Therefore when the shaft rotates, the strips will be moved longitudinally and, due to the pins 29 which pass through the diagonal slots 30, the strips will be moved transversely of the side bars 28' and will be moved into or out of an operative position according to the direction in which the shafts rotate. A triangular plate 35 is mounted upon each of the shafts 32 and 33 and cables 36 which are crossed as shown in Figs. 5 and 6 are connected with the plate as shown in these figures. Therefore, when the shaft 32 which is extended upwardly as shown in Fig. 1 and terminates in an actuating handle 37 is rotated, the two strips will be moved longitudinally in the same direction and both will be extended or retracted at the same time. In order to permit of the strips being secured in an extended or retracted position, the shaft 32 has been provided with a socket plate or disk 38 which is rigid upon the shaft and provided with pockets 39 to receive a lug 40 carried by a locking arm 41. This locking arm 41 is pivotally mounted by means of a bearing bracket 42 and has its free end portion cut to provide fingers 43 which will extend upon opposite sides of the shaft 32 when the locking arm or bar 41 is swung downwardly to an operative position as shown in Figs. 7 and 8. With the locking arm swung downwardly to the locking position and the shackle of a securing lock passed through openings in the fingers 43, the locking arm will be secured in the locking position and since the lugs will fit into one of the pockets 39, the shaft 32 will be held against rotation and the strips prevented from accidentally moving into or out of an operative position.

Each of the floats 1 is hollow and is divided into compartments by bulk-heads or partitions 45 to prevent the entire float from being flooded in case a puncture should be formed in one portion of the float. This will further permit water to be placed in the compartments through the necks 46 and thus provide ballast which will sink the floats into the water of the stream or river the desired amount and will also permit of water being placed only in certain of the compartments or to a greater extent in certain of the compartments so that the motor will be level in case the weight is not evenly distributed. Caps 47 are provided so that the necks 46 can be closed and prevent water from passing into the compartments when not desired. In the preferred form, the motor will be positioned between docks or piers, each of which will include a wall 48 provided with abutment shoulders 49 and 50 and the floats will be provided with rollers 51 for engaging the walls 48 and holding the floats in spaced relation to the walls and other rollers 52 and 53 for engaging the abutment shoulders 49 and 50 and preventing the motor from having movement down stream. These floats have tapered forward end portions which carry eyes 54 so that cables may be connected with these eyes and secured upon suitable snubbing posts to assist in holding the motor stationary in case the motor is positioned between the docks or piers or provide the sole means for holding the motor against movement down stream in case the motor is positioned in the middle of the stream or river.

When the motor is in place, it is desired to regulate the vertical position of the frame relative to the floats so that the paddle boards will extend into the water of the stream or river the desired extent. In order to do so, the standards 3 at the forward ends of the housing or generator support have been provided with rack bars to provide rack teeth 55 each engaged by a pinion 56 mounted upon a shaft 57 which is journaled in a supporting frame 58 which is mounted upon a float. A pawl 59 is carried by the frame 58 and engages ratchet wheel 60 carried by the shaft 57 so that when the shaft is rotated through the medium of the turning handle 61 to vertically adjust the frame, the shaft may be held against rotation in an opposite direction and thus the frame retained at the adjusted position. In order to guide vertical movement of the standards and retain the teeth of the standards in engagement with the pinion 56, there has been provided a roller 62 as shown in Fig. 13. There has also been provided locking means for retaining the standard in a vertically adjusted position which consists of a locking block 63 which is slidably mounted in one of the cross strips 64 of the frame 58 and provided with an actuating shaft or handle 65 which is slidably mounted in an opening formed in a second cross strip 66 of the frame. The locking block 63 is provided with teeth as shown so that when the locking block is moved to an operative position, the teeth of this block will engage the teeth of the standard 3 and thus serve to securely lock the standard in the vertically adjusted position and thus remove strain from the pawl 59.

Latches 67 are carried by the floats for engaging rack bars 68 carried by the standard 2 and assisting in retaining the frame in a raised position. These latches 67 are pivotally mounted by bearing brackets 69 and each is provided with a treadle extension 70 at its pivoted end so that the latch can be easily swung to an inoperative position when it is desired to lower the frame. From an inspection of Fig. 4, it will be seen that the standard 2 fits into guides 71 which are carried by the floats to guide the vertical movement of the frame. These guides 71 are thickened as shown at 72 so that they will serve as means to brace the frame against movement down stream. In order to assist in bracing the frame against movement down stream there has been provided abutments 73 which engage the standards 3.

I claim:

1. A water motor comprising a frame, endless carriers moving longitudinally of said frame, paddle boards pivotally connected with said carriers, means movably carried by said frame and movable into and out of position for engaging the paddle boards for supporting the paddle boards in an inoperative position, and means for moving said means into and out of position for engaging said paddle boards.

2. A water motor comprising, a frame, endless carriers moving longitudinally of the frame, paddle boards pivotally connected with said carriers, means for limiting swinging of the paddle boards in one direction beyond a position at right angles to the carriers when moved to an operative position, strips slidably carried by the frame adjacent the lower tracks for supporting the paddle boards in an inoperative position when said strips are moved to an operative position and means for moving the strips into and out of position for engaging the paddle boards.

3. The structure of claim 2 having the means for moving the strips consisting of vertical shafts journaled in the frame and provided with side arms engaging said strips, means for rotating one of said shafts, plates carried by said shafts, and connecting means for said plates extending in crossed relation whereby oscillatory movement may be transmitted from one shaft to the other.

4. The structure of claim 2 having the means for moving the strips consisting of vertical shafts journaled in the frame and provided with side arms engaging said strips, means for rotating one of said shafts, and means for transmitting oscillatory movement from one shaft to the other.

5. The structure of claim 2 having the means for moving the strips consisting of vertical shafts journaled in the frame and having their lower end portions provided with side arms engaging said strips, means for rotating one of said shafts, means for transmitting oscillatory movement from one shaft to the other and means for locking the driving shaft against rotation, said means comprising a socket member rigid upon the driving shaft and provided with pockets, a locking arm pivotally mounted and having its free end portion provided with a cutout to receive the driving shaft and a tooth carried by said arm for fitting into a pocket of the socket member and holding the driving shafts against rotary movement.

6. A water motor comprising floats, rollers carried by the ends and sides of said floats for engaging the sides of piers and for engaging vertically disposed abutment shoulders of the piers, the rollers holding the floats in spaced relation to the piers and holding the floats against movement down stream, a frame carried by said floats, water actuated power means carried by said frame, and means for taking power from said water actuated power means when the same is in motion.

7. The structure set forth in claim 1, said first named means being a pair of spaced retractible members cooperating with the free edges of the boards.

8. A water motor embodying spaced retractible strips for maintaining the paddle boards in an inoperative state, a vertically disposed operating shaft acting on one of the strips, and a connection between the strips for causing simultaneous operation thereof.

9. The structure set forth in claim 8, together with means for locking the shaft against rotation, said means embodying a socketed member secured to the shaft and a pivoted release arm carrying a projection for reception in the socket.

In testimony whereof I have hereunto set my hand.

JOHN W. CARLSON.